United States Patent [19]

Mayer

[11] 3,842,409
[45] Oct. 15, 1974

[54] IONIZATION DETECTOR APPARATUS
[75] Inventor: Ronn H. Mayer, Brewster, Kans.
[73] Assignee: Unitec, Inc., Brewster, Kans.
[22] Filed: Dec. 13, 1972
[21] Appl. No.: 314,689

[52] U.S. Cl......... 340/228.1, 340/228 R, 340/237 S, 250/389, 307/251, 328/108, 235/92 R, 324/71 CP, 317/157
[51] Int. Cl. ........................................... G08b 21/00
[58] Field of Search......... 340/228 R, 228.1, 237 R, 340/237 S, 251; 250/381, 389; 328/115, 116, 117, 108; 307/251; 235/92 CT, 92 PC, 92 R, 92 MS; 324/71 CP; 317/133.5, 157

[56] References Cited
UNITED STATES PATENTS

| 3,321,628 | 5/1967 | Webb................................. 250/374 |
| 3,486,025 | 12/1969 | Brinerhoff et al. ................. 250/389 |
| 3,537,087 | 10/1970 | Osborne .......................... 340/237 S |
| 3,543,260 | 11/1970 | Engh .............................. 340/228 R |
| 3,551,672 | 12/1970 | Homer...................... 340/237 S UX |
| 3,564,524 | 2/1971 | Walthard et al................. 340/237 S |
| 3,573,777 | 4/1971 | Kompelien...................... 340/237 S |
| 3,671,746 | 6/1972 | Thiele et al......................... 250/374 |
| 3,714,433 | 1/1973 | Kobayashi........................... 250/381 |

Primary Examiner—John W. Caldwell
Assistant Examiner—William M. Wannisky

[57] ABSTRACT

A fire warning apparatus incorporating an ion detector which generates an output in the presence of a fire. A pulse generation circuit emits a time sequence of pulses and applies them simultaneously to the signal level detector circuit and to a pulse counter circuit. If the ion detector has an output which is indicative of a fire, the signal level detector operates to suppress the pulses being applied by the signal level detector to the pulse counter circuit. The pulses being applied directly to the counter circuit will be transmitted through the circuit operating the alarm system. Special circuits are included to provide a visual indication of operability of the electronic circuit and for disabling the pulse generator to provide a continuously visual alarm.

6 Claims, 5 Drawing Figures

IONIZATION DETECTOR APPARATUS

Numerous types of ionization detectors are known in the prior art using vacuum tube structures and the like which are subject to failure due to vacuum leakage and aging and not operable as a continuously sampling type process as in the applicant's invention. The prior art fire warning systems are subject to possible mechanical and electrical component failures without the user thereof aware of such failure.

In one preferred embodiment of this invention, an ionization detector apparatus is provided including a circuit including an ionization chamber connected to a sampling check; a differential circuit having astable multivibrator circuit connected to the holding circuit and to a relay driver to set off an alarm relay circuit. The ionization chamber is operable to continuously sample the atmosphere for products of combustion and when the ultimate level is reached, an alarm circuit is set off.

One other object of this invention is to provide an ionization detector apparatus for detecting products of combustion utilizing solid state components to alleviate failure problems and designed so that, if a failure occurs, the detector will "go-off" to indicate an electronic component failure.

One other object of this invention is to provide an ionization detector apparatus calibrated on actual products of combustion to an operable level and the sensitivity can be adjusted if so desired.

Another object of this invention is to provide an ionization detector apparatus which is provided with a means for ascertaining whether the unit is energized at all times.

One other object of this invention is to provide an ionization detector apparatus which is economical to manufacture; reliable in usage; rigidly constructed for life time usage; being easily assembled and replaced if required; and sensitive in operation.

Various other objects, advantages, and features of the invention will become apparent to those skilled in the art by the following discussion, taken in conjunction with the accompanying drawings, in which.

Figure 1:
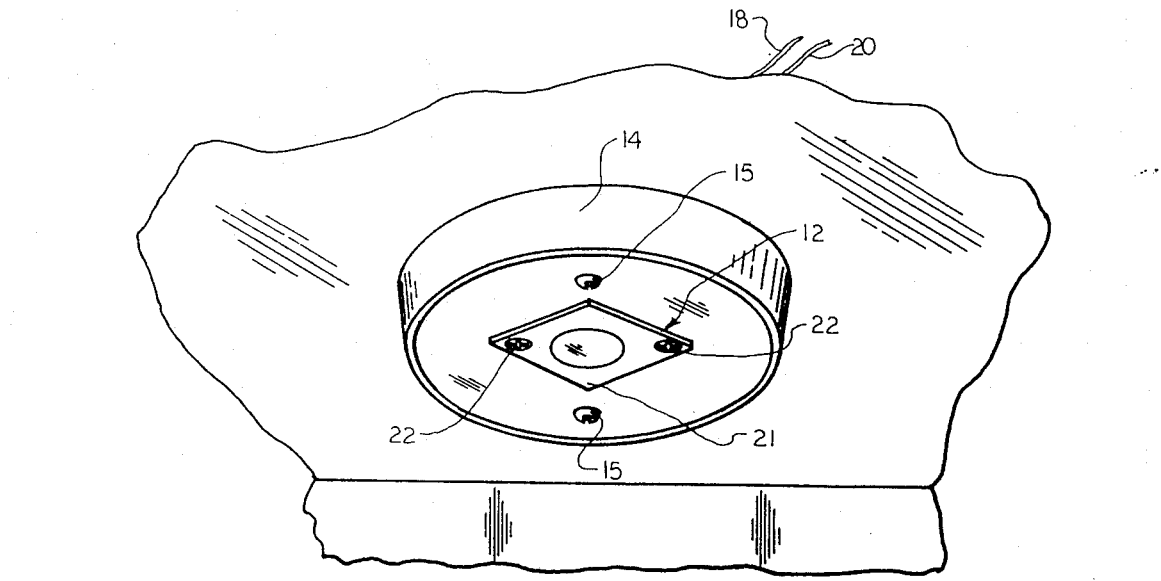
FIG. 1 is a fragmentary perspective view of a ceiling having an ionization detector apparatus of this invention secured thereto.

The following is a discussion and description of preferred specific embodiments of the new ionization detector apparatus of this invention, such being made with reference to the drawings, thereupon the same reference numerals are used to indicate the same or similar parts and/or structures. It is to be understood that such discussion and description is not to unduly limit the scope of the invention.

Referring to the drawings in detail and more particularly to FIG. 1, the ionization detector apparatus or fire warning apparatus of this invention, indicated generally at 12, is shown as mounted within a housing 14 which, in turn, is secured by bolt members 15 to a ceiling 16.

It is obvious that the ionization detector apparatus 12 can be secured in various and numerous locations but, in this embodiment, it is shown as an attractive ceiling fixture which could be combined with light fixtures, air ducts, etc. as desired.

It is seen that a pair of power lines 18 and 20 are connected to the ionization detector apparatus 12 which, in turn, may be removed from the housing 14 by release of the pair of bolt members 15. A collector plate 21 is held adjacent the housing 14 by screw members 15. On failure of an ionization detector apparatus 12, it may be easily replaced through a connector plug (not shown) mounted in power lines 18 and 20 and forwarded for repair.

Figure 2:
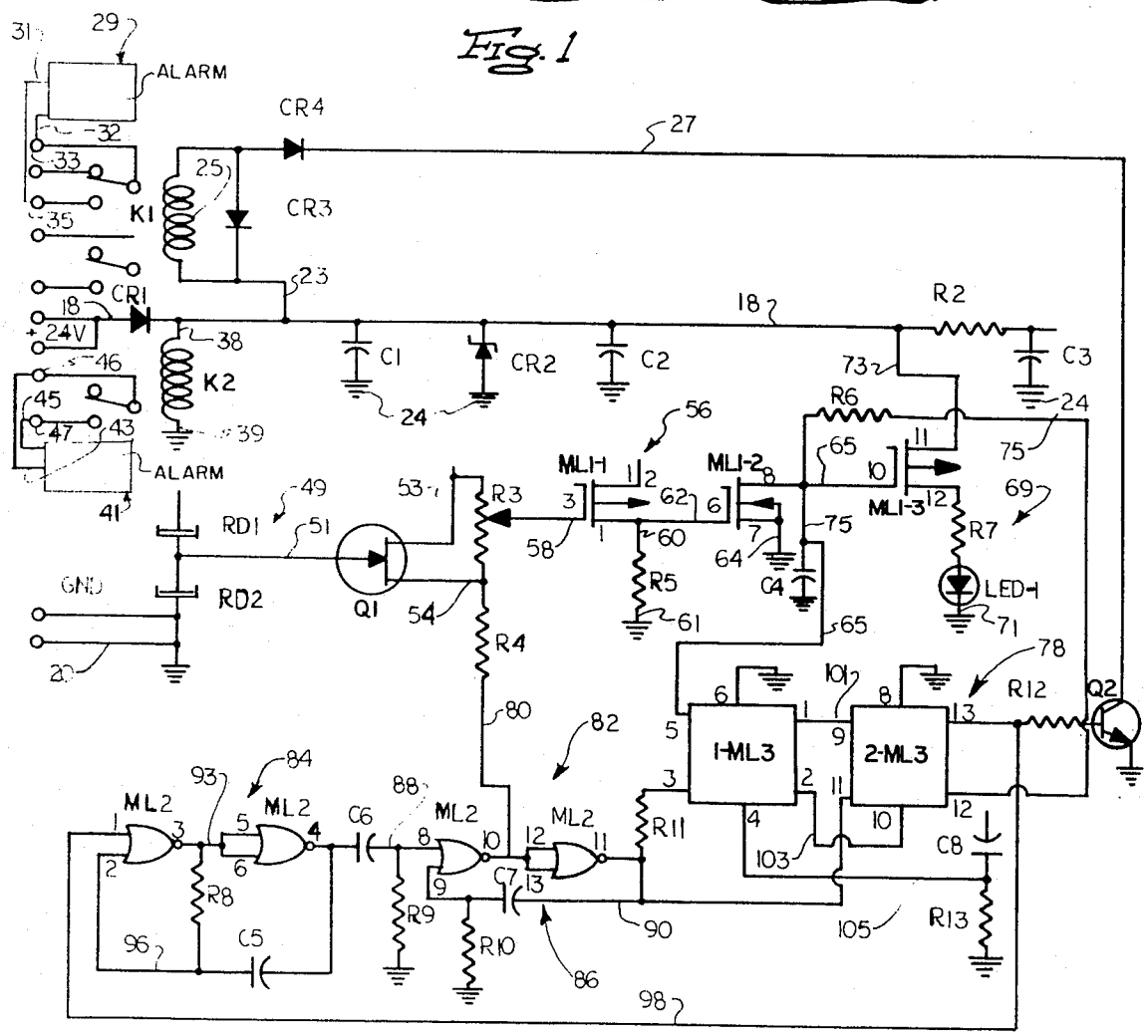
FIG. 2 is an electrical schematic diagram showing the components for the operation of the ionization detector apparatus of this invention.

The circuitry of the invention is set forth in FIG. 2. On discussing the various elements of the invention, it is seen that a 19–28 VDC power source is preferred which may be either full wave rectified or filtered DC and 24 VDC power is most preferred.

CIRCUIT DESCRIPTION

The input power in line 18 is connected in series to a diode CR1, a capacitor C1, another diode CR2, another capacitor C2, a resistor R2, and a third capacitor C3 all of which are connected to ground indicated at 24. The combination of these elements constitutes the main power supply for the ionization detector apparatus 12.

A first alarm circuit is presented from line 18 to line 23 connected to the coil 25 of an alarm relay K1. The other side of the coil 25 is connected through a diode CR4 in line 27 to the alarm circuit transistor Q2. Another diode CR3 is connected between lines 23 and 27. The coil 25 in relay K1 is shown in the de-energized state with an alarm device 29 connected by lines 31 and 32 to terminals 33 and 35. On enerization of relay K1, it is seen that a circuit is completed to the alarm device 29 which may be battery operated or powered by regular 110 V. Current.

A second alarm circuit includes an alarm relay K2 having a coil 38 connected to line 18 and by line 39 to ground. Another alarm device 41 is connected by lines 43 and 45 to terminals 46 and 47. The alarm relay K2 is shown in the energized condition as power to coil 38 when placed in operation. On a power failure, the alarm relay K2 will close lines 43 and 45 to sound off the alarm device 41 which is battery powered. The alarm devices 29 and 41 could be the same unit if both battery operated and provided with a signal light illustrating the integrity of the battery units.

The other power line 20 is connected to the other detector common grounds 24, 39, 64, 61, 71 and the collector plate 21. An ionization detector chamber 49 has radium chambers RD1 and RD2 which are connected to a common line 51. The line 51 is connected to a transistor Q1 which is of a JFET transistor type being a gate means and being a part of a high impedance circuit.

The transistor Q1 is connected by lines 53 and 54 to a signal level detector means indicated generally at 56. The lines 53 and 54 are connected to a potentiometer and resistor portion R3 which, in turn, is connected by line 58 to a circuit ML1-1 having contact pins 1, 2, and 3; line 60 to resistor R5 and to ground 61; and line 62 to a circuit ML1-2 having contact pins 6, 7, and 8; which forms the signal level detector means 56. ML1-2 is connected by line 64 to ground.

A line 65 is connected to a visual signal indicating circuit 69 having in series ML1-3 having contact pins 10, 11, and 12; a resistor R7; and a visual indicating light or light emitting device LED-1 which is connected by line 71 to ground.

The ML1-3 is connected by line 73 to line 18 of the power supply circuit. The line 65 from ML1-2 is also connected by line 75 to a capacitor C4 to ground and through a resistor R6 to a pulse counter means indicated at 78.

As shown in FIG. 2, the line 54 from transistor Q1 is connected to a line 80 and through a resistor R4 to a pulse generating means indicated at 82. The pulse generating means 82 includes an astable multivibrator circuit 84 and a monostable multivibrator circuit 86.

More particularly, the mono-stable multivibrator circuit 86 includes circuits connected to line 80 having ML2 with contact pins 8, 9, and 10; ML2 having contact pins 11, 12, and 13; a line 88 connected through a resistor R9 to ground; a line 90 connecting contact pins 9 and 11 through a capacitor C7; and a resistor R10 connected from line 90 to the common ground.

The astable multivibrator circuit 84 includes a capacitor C6 connected in line 88 to ML2 having contact pins 4, 5, and 6. The contact pins 5 and 6 are connected by a line 93 to ML2 having contact pins 1, 2, and 3. The contact pins 2 and 4 are connected in a line 96 through a capacitor C5. Also, lines 93 and 96 are connected by a line 97 through a resistor R8. The contact pin 1 of ML2 is connected by a line 98 and resistor R12 to the alarm transistor Q2.

Now, on returning to the bi-stable multivibrator pulse counter means 78, the circuit includes a first section being 1-ML3 having contact pins 1, 2, 3, 4, 5, and 6 and a second section being 2-ML3 having contact pins 8, 9, 10, 11, 12, and 13. From the mono-stable multivibrator circuit 82, the line 90 is connected through a resistor R11 to contact 3 of 1-ML3. Contact pin 5 of 1-ML3 is connected through line 65 to capacitor C4 and contact 6 is connected to ground. Contact pin 1 is connected by a line 101 to contact pin 9 of 2-ML3 which, in turn, has contact pin 10 connected by a line 103 to contact pin 2 of 1-ML3. It is seen that contact pin 4 of 1-ML3 is connected by line 105 to the junction of a capacitor C8 and a resistor R13. Contact pin 12 is connected through line 75 to the signal level detector means 56. On 2-ML3, the contact pin 8 is connected to ground and contact pin 13 is connected through resistor R12 to the base of transistor Q2.

DETAILED OPERATION

Figure 3A:
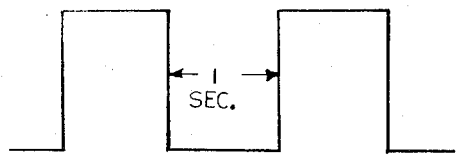
FIG. 3a is a wave shape from pin 1 of ML2 of the ionization detector apparatus of this invention.

For a place to start, let us assume that we have just energized the circuits. In this case, ML3 pin 4 will receive a reset pulse from capacitor C8 and resistor R13. This pulse will remain high until the voltage across R13 drops below the threshold level of the reset input. We now have pin 1 of 1-ML3 low and pin 2 of 1-ML3 high. Pin 2 of ML3 is connected to pin 10 of 2-ML3 thus applying a positive reset voltage to the second section of ML3. Thus we start the sequence with 2-ML3 pin 13 at a low level and pin 12 of 2-ML3 at a high level. Pin 13 of 2-ML3 acts as the base drive for the transistor Q2 thus when pin 13 is low, transistor Q2 is off and alarm relay K1 is de-energized. Note that pin 1 of ML2 is connected to the junction of R12 thus the input to pin 1 of ML2 is low. This gates the astable multivibrator formed both by pins 1, 2, and 3 at ML2, pins 5, 6, and 4 of ML2. Pin 1 receives a high input the astable multivibrator free runs with a wave length as shown in FIG. 3a.

Figure 3B:
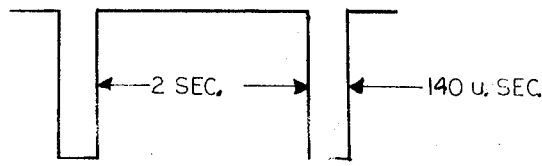
FIG. 3b is a wave shape from pin 10 of ML2 of the ionization detector apparatus of this invention.

The capacitor C6 and resistor R9 combine to serve as a differentiating circuit and converts the broad positive square wave out of pin 4 of ML2 into narrow wave and a trigger for the last two sections of ML2 which are connected as a monostable multivibrator. Pin 10 of ML2 thus has a wave shape as shown in FIG. 3b.

The mono-stable multivibrator has a voltage level of 12 volts for approximately 2 seconds and goes to zero during the sample period which is approximately 140 microseconds.

Figure 3C:
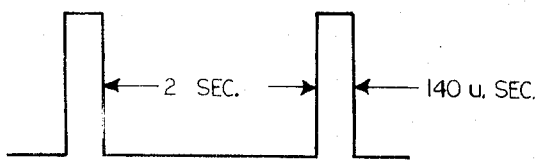
FIG. 3c is a wave shape from pin 11 of ML2 of the ionization detector apparatus of this invention.

Pin 11 of ML2 has a wave shape as shown in FIG. 3c. The wave shape is zero for approximately 2 seconds and goes to plus 12 volts during the 140 microseconds sampling intervals.

Lets proceed through the sample or ionization detector chamber first. Just prior to the negative transistion of the pulse from pin 10 of ML2 the bottom of resistor R4 is biased to approximately +12 volts, thus we have transistor Q1 in the cut off mode during the time that pin 10 of ML2 is high.

The gate of Q1 is connected to radium detector chamber RD1 and radium detector chamber RD2. RD1 is a reference detector and RD2 is the actual active detector. In the absence of a fire, the gate potential of transistor Q1 is at approximately 6 volts and transistor Q1 does not conduct. ML1-1 is in the off state. ML1-2 is in the off state. ML1-3 is in the off state and indicator LED-1 is not lit. Note the transistor Q1 is cut off and the gate of transistor Q1 presents a very high impedance to the ionization detectors RD1 and RD2. Pin 5 has gone high since capacitor C4 has charged through resistor R6 from the high on pin 12 of ML3. During the sample period, pin 10 of ML2 goes low and transistor Q1 is brought into conduction and, for all practical purposes, the voltage that was present on the gate of transistor Q1 now appears at the junction of resistor R3 and resistor R4. Since the sample period is very short, stray capacitors will hole the gate high and thus preserve the low leakage of the circuit. In the absence of a fire, the +6 volts on the gate appears at the junction of resistor R3 and resistor R4. This potential or some portion of it, determined by the setting of resistor R3, is coupled to pin 3 at ML1-1. Resistor R3 is set such that in the absence of a fire, ML1 will conduct during the sample pulse. That is, the potential of pin 3 is above the threshold of ML1 and it conducts and when ML1-1 conducts, pin 1 of ML1-1 goes high turning on ML1-2 consisting of pins 6, 7, and 8. This quickly discharges capacitor C4 through ML1 pins 8 and 7, causing pin 5 of ML3 to go low. The indicator LED-1 now will light since when pin 10 at ML1-3 goes low, ML1-3 conducts through R7 to LED-1. Now in order to make the lighting of the indicator LED-1 visible, ML1-3 is held on after the sample voltage goes high by the action of resistor R6 and capacitor C4. Thus, the indicator LED-1 is on during the sample period and during the delay period caused by capacitor C6 and resistor R4.

Now, proceed to 1-ML3 and, during the sample period, pin 5 of 1-ML3 is held low by the action of ML1-2 (This assumes that no fire has been detected). It does not immediately return to a high due to the delay induced by relay R6 and capacitor C4 and 1-ML3 is a dual type D flip-flop. It is connected such that it does not operate in a synchronous mode, and when pin 11 of ML2 goes high this is immediately coupled to pin 11 of 2-ML3 and will normally cause the potential on pin 9 of 2-ML3 to be transferred to pin 13. However, recall that pin 10 of 2-ML3 is high thus pin 13 will remain low and this section is in the reset mode. It is seen that 1-ML3, pin 2, is coupled to the reset pin of 2-ML3 pin 10 thus the second section being 2-ML3 cannot change state unless the first section 1-ML3 changes state. After a delay time given by resistor R11 and the input capacitor of pin 3, 1-ML3, pin 3 goes high and the potential at pin 5 of 1-ML3 is transferred to pin 1. In this case, pin 5 is zero so no transfer takes place.

Thus, it is noted that the combination of 1-ML3 anad 2-ML3 requires that two pulses be missed prior to sounding the alarm. This comes about since 2-ML3 is clocked prior to the clocking of 1-ML3.

The circuit of this invention, keeps the transistor Q1 or JFET in a cut off mode and "pulses" the FET "ON" occasionally, to sample the signal level. The duration of the "ON" pulse is short enough that the stray and/or added capacity at the JFET transistor Q1 high impedance input supplies leakage current to the JFET transistor Q1 during the pulsed "ON" mode and keeps the JFET transistor Q1 from loading down the high impedance circuit during this sample interval. The uniqueness of this invention is that we use a high leakage JFET to do the job of a low leakage JFET transistor by pulsing the JFET transistor Q1 at such a duty cycle that the stray capacity maintains a normal circuit balance during "ON time" (by supplying leakage current) and has sufficient time to recover during "OFF time."

Let us now assume that radium detector chamber RD2 has detected a fire, the gate of transistor Q1 will tend to go toward +12 volts, and during the sample pulse, this will be coupled over the junction of resistor R4 and resistor R3. One notes that this is the same condition that is present during the positive portion of the mono-stable output hence ML1-1 does not conduct and ML1-2 does not conduct and the capacitor C4 is not discharged. In this case, the indicator LED-1 does not light.

In this situation, the pin 5 of 1-ML3 is high, pin 1 of 1-ML3 is low, and pin 2 of 1-ML3 is high. Also, pin 9 of 2-ML3 is low, pin 13 of 2-ML3 is low, pin 12 of 2-ML3 is high and pin 10 of 2-ML3 is high. The second section being 2-ML3 is in the reset mode so pin 13 thereof remains low and pin 12 remains high.

After the delay induced by resistor R11 and the input capacitance of pin 3, 1-ML3, pin 3 then goes high transferring the high on pin 5 of 1-ML3 to pin 1 and pin 2 of 1-ML3 now goes low enabling the second section being 2-ML3.

On the next clock pulse, if the detector unbalance persists as it would in the case of a fire, then when pin 11 of 2-ML3 goes high, the high on pin 9 of 2-ML3 is transferred to pin 13 on 2-ML3. Now, pin 12 of 2-ML3 goes low and, after a delay induced by resistor R6 and capacitor C4, pin 10 of ML1-3 goes low and the indicator LED-1 lights. Meanwhile, since pin 13 of 2-ML3 has gone high, the base of transistor Q2 has drive and transistor Q2 turns on thereby energizing relay K1 and sounding the alarm. Note that resistor R12 is tied to pin 13 on 2-ML3. Also, note that the junction of R12 is tied to pin 1 of ML2. Recall that in order for the astable multivibrator to operate, pin 1 of ML2 must be low. In this case, note that pin 13 of 2-ML3 has gone high thus the junction of resistor R12 will be high to disable the astable multivibrator no longer providing triggering pulses through the mono-stable multivibrator and, therefore, pins 8 and 9 of ML2 will go low and pin 10 of ML2 will go high and the circuit will be in the non-sampling mode.

This device has the feature that, if a single pulse is missed such as due to a dirty chamber, the indicator LED-1 will blink on alternate pulses thus calling attention to this undesirable condition on a single missed pulse mode, and the ionization detector apparatus requires that two pulses be missed in order to activate the alarm circuit. Lets assume the initial conditions as before, and pin 5 of 1-ML3 is high, on the next positive transistion of the clock, nothing happens on pin 13 of 2-ML3 since pin 10 of 2-ML3 is held high by pin 2 of 1-ML3 which is high so that 2-ML3 is in the reset mode.

After the time delay given by resistor R11 and the input capacitor of ML3, pin 3 of 1-ML3 goes high transferring the high on pin 5 of 1-ML3 to pin 1 of 1-ML3. The pin 2 of 1-ML3 goes low enabling the second section being 2-ML3.

Now assume that on the next sampling pulse, radium detector chambers RD1 and RD2 are in balance, ML1-1 will turn on, ML1-2 will turn on and discharge capacitor C4 and pin 5 of 1-ML3 will be low. The clock pulse on pin 11 of 2-ML3 goes high transferring the high on pin 9 to pin 13 of 2-ML3. This would activate the alarm except that the clock on pin 3 of 1-ML3 goes high after a short delay. On transferring the low on pin 5 of 1-ML3 to pin 1 of 1-ML3, pin 2 of 1-ML3 goes high resetting pin 13 low and pin 12 high of 2-ML3. The indicator LED-1 now lights and operation proceeds in the normal fashion. Note, the time delay between pin 13 of 2-ML3 going high and then being reset to zero is too short to allow the alarm relay to be energized.

It is seen that the ionization detector apparatus of this invention provides a structure which is made of solid state circuitry, substantially failure proof and having means therein which readily indicate the failure of the unit for safety and reliability purposes. The ionization detector apparatus requires more than one missed pulse indicating the presence of a fire before sounding an alarm but presents a signal as to possible unit maintenance problems such as a dirty ionization chamber. Additionally, the ionization detector apparatus can be readily replaced by merely unplugging for ease of service and maintenance.

While the invention is described in conjunction with preferred specific embodiments thereof, it is to be understood that this invention is intended to illustrate and not to limit the scope of the invention, which is defined by the following claims.

I claim:

1. A fire warning apparatus, comprising:
  a. an ionization detector means,
  b. a gate means connected to said ionization detector means,
  c. signal level detector means connected to said gate means,
  d. pulse generator means having its output connected to said gate means,
  e. pulse counter means having an output and first and second input means, said first input means connected to the output of said signal level detector means and said second input means connected to said pulse generator means, said pulse counter means generating an output when a signal from said detector means has passed through said gate to said first input means, and said pulse means has applied a predetermined number of pulses to said second input means, f. alarm means connected to the output of said pulse counter means and responsive to said output from said pulse counter means.

2. A fire warning apparatus as described in claim 1, including;
   a. means for applying said output from said counter means to said pulse generating means thereby deactivating said generating pulse means.

3. A fire warning apparatus as described in claim 1, including;
   a. a visible indicator means connected to the output of said signal level detector means to indicate operability of said fire warning apparatus.

4. A fire warning apparatus as described in claim 1, wherein;
   a. said gate means comprising a junction field effect transistor member.

5. An ion detector output circuit, comprising;
   a. first and second ion detectors generally connected between a source of voltage and ground,
   b. a junctive field effect transistor having its input connected to the junction between said first and second ion detectors,
   c. a metal oxide semi-conductor,
   d. a pulse generator,
   e. voltage adjustable means connected between a source of voltage and an output of said pulse generator to the input of said metal oxide semi-conductor, and
   f. means for connecting the output of said junction field effect transistor across said voltage adjustable means, whereby the voltage at the output of said junction field effect transistor can be adjusted to equal the voltage of said ion detectors and adjustable to match the threshold voltage of said metal oxide semi-conductor.

6. An ion detector output circuit, comprising;
   a. an ion detector means,
   b. gate means having its input connected to said ion detector means,
   c. a signal level detector means having its input connected to the output of said gate means,
   d. driven circuit means having its input connected to the output of said level detector means,
   e. indicator means having input connected to the output of said driven circuit means,
   f. triggered signal means having first and second outputs, said first output connected to the output of said gate means,
   g. first and second counter means each having first and second outputs and reset means,
   h. said first input connected to the second output of said trigger means and said second inputs connected to the input of said indicator means, said first input of said first counter means connected to the second input of said second counter means, said second output of said first counter means connected to the reset of said second counter means connected to said second output of said second counter means to the input of said indicator means,
   i. alarm means, and
   j. means connecting the first output of said second counter means to said alarm means.

* * * * *